(12) United States Patent
Sugiyama

(10) Patent No.: US 11,765,132 B2
(45) Date of Patent: Sep. 19, 2023

(54) INFORMATION PROCESSING APPARATUS, NON-TRANSITORY COMPUTER READABLE MEDIUM, AND COMMUNICATION SYSTEM

(71) Applicant: FUJIFILM Business Innovation Corp., Tokyo (JP)

(72) Inventor: Ichiro Sugiyama, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 189 days.

(21) Appl. No.: 17/306,970

(22) Filed: May 4, 2021

(65) Prior Publication Data
US 2022/0150219 A1    May 12, 2022

(30) Foreign Application Priority Data

Nov. 10, 2020 (JP) ................................ 2020-187160

(51) Int. Cl.
| | | |
|---|---|---|
| H04W 12/06 | (2021.01) | |
| H04W 12/08 | (2021.01) | |
| G06F 21/71 | (2013.01) | |
| H04L 9/40 | (2022.01) | |
| G06F 13/20 | (2006.01) | |
| G06F 21/72 | (2013.01) | |

(52) U.S. Cl.
CPC .......... *H04L 63/0272* (2013.01); *G06F 13/20* (2013.01); *H04L 63/0876* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 8,077,681 B2 | 12/2011 | Ahmavaara et al. | |
| 10,742,650 B2* | 8/2020 | Sakamoto | ............... G06F 13/00 |
| 10,887,295 B2* | 1/2021 | Muhanna | ............... H04W 12/06 |
| 2003/0185178 A1* | 10/2003 | Chitrapu | ............... H04W 12/06 |
| | | | 370/335 |

(Continued)

FOREIGN PATENT DOCUMENTS

JP    3984993    10/2007

OTHER PUBLICATIONS

KR20070108365. English Translation. (Year: 2012).*
WO 2020147044 A1. English Translation. (Year: 2020).*

*Primary Examiner* — Venkat Perungavoor
(74) *Attorney, Agent, or Firm* — JCIPRNET

(57) ABSTRACT

An information processing apparatus includes a processor configured to transmit connection information regarding a repay apparatus to a terminal in a case where terminal unique information is received from the terminal subjected to network authentication performed by communication equipment of a carrier, and cause the terminal to connect to the relay apparatus using the connection information regarding the relay apparatus, where the relay apparatus is associated with the terminal unique information as an apparatus to be connected to a local network, and where the relay device is on a public network connected to a mobile carrier network provided by the carrier. If the relay apparatus successfully authenticates the terminal, the terminal and the relay apparatus are connected to each other over a virtual private network.

14 Claims, 12 Drawing Sheets

(56) References Cited

U.S. PATENT DOCUMENTS

| | | | | |
|---|---|---|---|---|
| 2004/0139201 A1* | 7/2004 | Chaudhary | ............. | H04L 63/08 |
| | | | | 709/229 |
| 2008/0298595 A1* | 12/2008 | Narayanan | ............ | H04W 12/06 |
| | | | | 380/278 |
| 2011/0016309 A1* | 1/2011 | Motoyama | .......... | H04L 12/4633 |
| | | | | 713/153 |
| 2012/0014365 A1* | 1/2012 | Takano | ................ | H04W 48/17 |
| | | | | 370/338 |
| 2021/0274376 A1* | 9/2021 | Liu | .................... | H04W 84/042 |

* cited by examiner

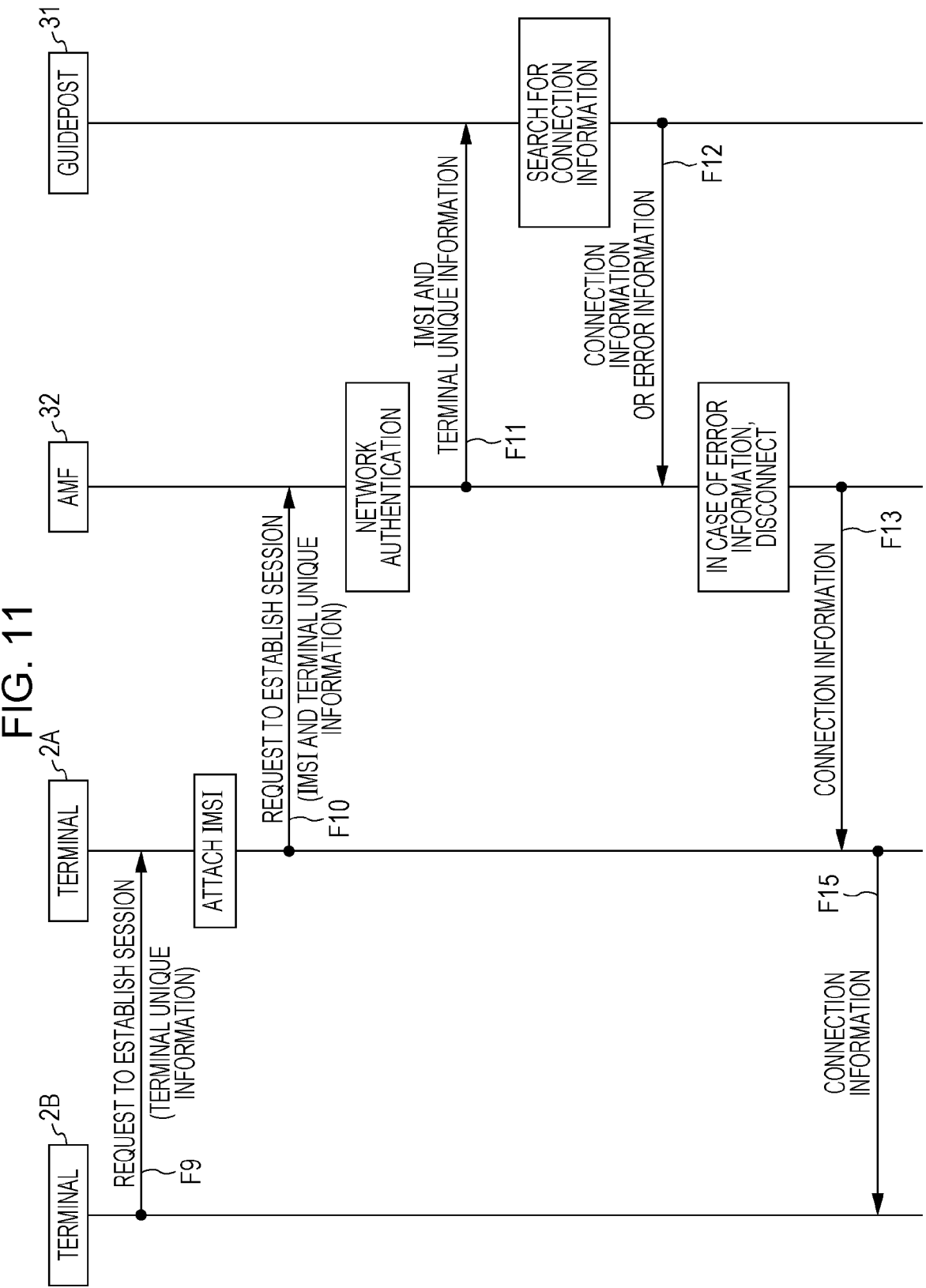

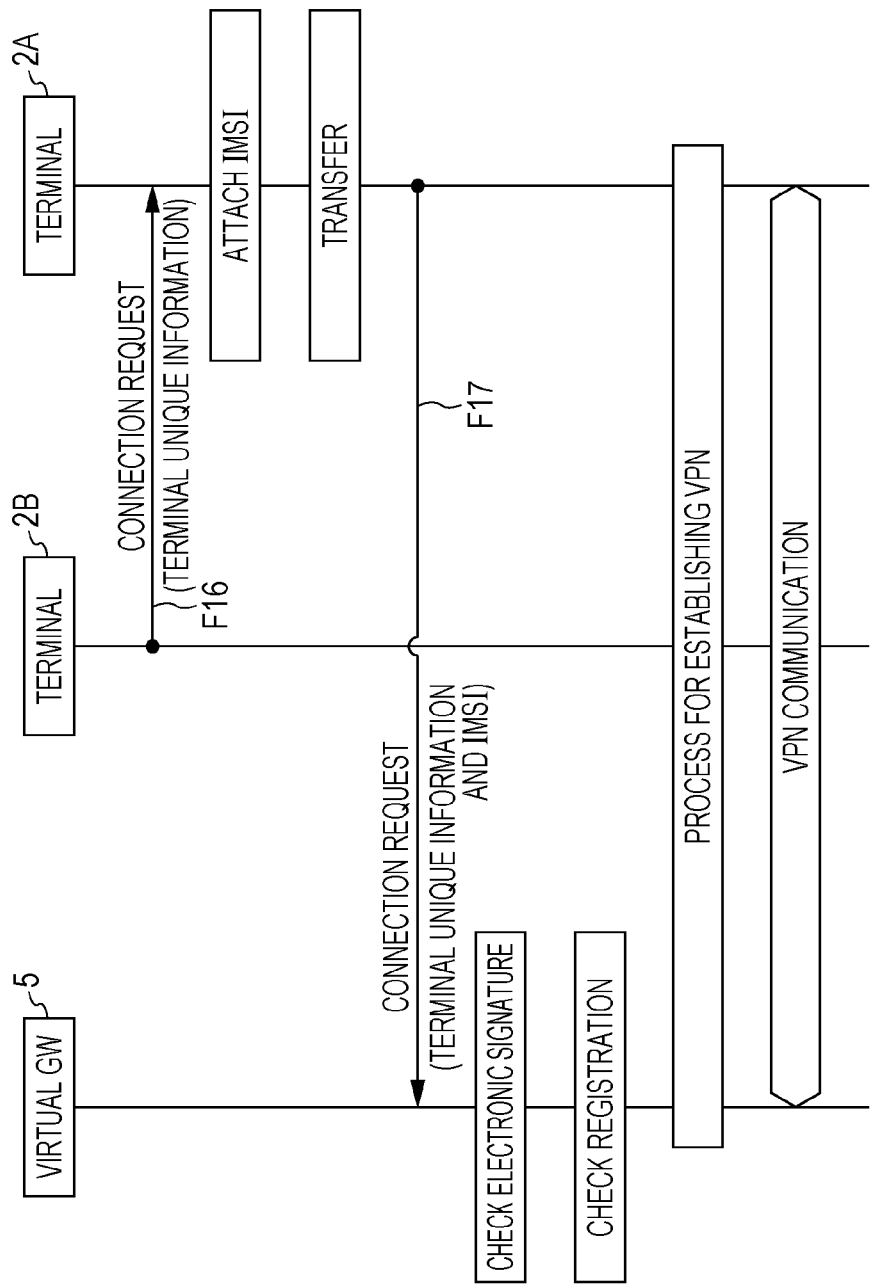

INFORMATION PROCESSING APPARATUS, NON-TRANSITORY COMPUTER READABLE MEDIUM, AND COMMUNICATION SYSTEM

CROSS-REFERENCE TO RELATED APPLICATIONS

This application is based on and claims priority under 35 USC 119 from Japanese Patent Application No. 2020-187160 filed Nov. 10, 2020.

BACKGROUND

(i) Technical Field

The present disclosure relates to an information processing apparatus, a non-transitory computer readable medium, and a communication system.

(ii) Related Art

Japanese Patent No. 3984993 discloses a method for establishing a connection over at least one cellular packet switching network including at least one user terminal authentication and approval means and at least one gateway node and a wireless local area network (LAN) or another local network communicating with at least one user terminal. The method includes authenticating a connection from the user terminal over the wireless LAN or the other local network, selecting, in the authenticating, one of the at least one gateway node, signaling tunnel parameter information regarding the selected gateway node to the wireless LAN or the other local network, and establishing, on the basis of the tunnel parameter information, a tunnel connection between the wireless LAN or the other local network and the selected gateway node.

SUMMARY

When a user is out of office and desires to connect to an in-house LAN of his/her place of work, for example, the user might connect to the in-house LAN over a mobile carrier network provided by a carrier using a terminal such as a smartphone.

In this case, information stored in a storage device connected to the in-house LAN is transmitted to the outside of the in-house LAN.

Whereas a carrier ensures communication safety inside a mobile carrier network, the carrier does not manage a network for connecting a certain network closed within a certain organization, such as an in-house LAN, and the mobile carrier network to each other. Communication safety, therefore, has been conventionally ensured by connecting the mobile carrier network and the certain network with a dedicated line.

Aspects of non-limiting embodiments of the present disclosure relate to an information processing apparatus, a non-transitory computer readable medium, and a communication system capable of achieving a communication environment in which communication safety between a terminal and a certain network is ensured with a cost lower than when a mobile carrier network and the certain network is connected to each other by a dedicated line.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: transmit, in a case where terminal unique information is received from a terminal subjected to network authentication performed by communication equipment of a carrier, connection information regarding a relay apparatus to the terminal, the relay apparatus being associated with the terminal unique information as an apparatus to be connected to a local network; and cause the terminal to connect to the relay apparatus, which is on a public network connected to a mobile carrier network provided by the carrier, using the connection information regarding the relay apparatus and, if the relay apparatus successfully authenticates the terminal, the terminal and the relay apparatus to be connected to each other over a virtual private network.

BRIEF DESCRIPTION OF THE DRAWINGS

An exemplary embodiment of the present disclosure will be described in detail based on the following figures, wherein:

FIG. 11 is a sequence diagram illustrating a first half of an example of a process for connecting, to the local network, the terminal that does not have the function of directly connecting to the mobile carrier network; and FIG. 12 is a sequence diagram illustrating a second half of the example of the process for connecting, to the local network, the terminal that does not have the function of directly connecting to the mobile carrier network.

DETAILED DESCRIPTION

Figure 1:
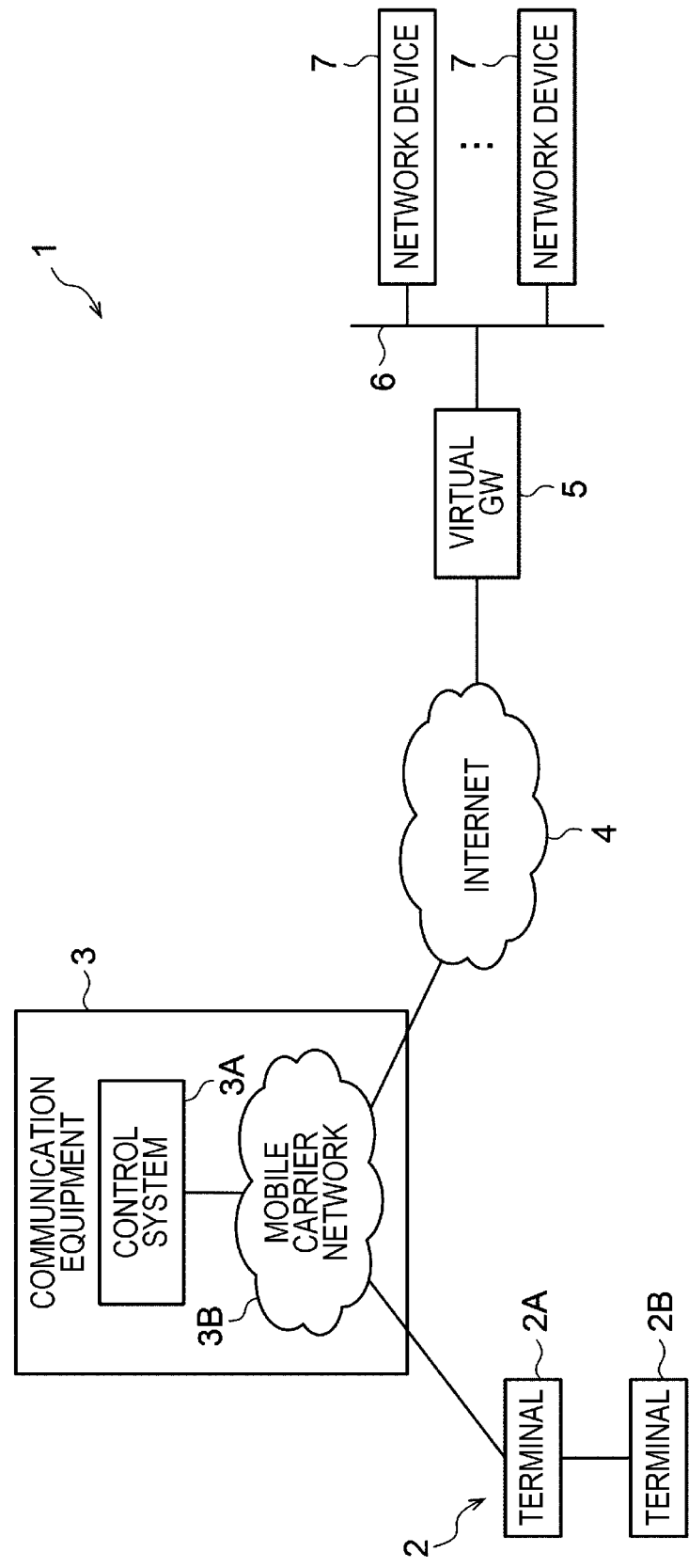
FIG. 1 is a diagram illustrating an example of the configuration of a communication system.

An exemplary embodiment will be described hereinafter with reference to the drawings. The same components and steps are given the same reference numerals throughout the drawings, and redundant description thereof is omitted.

FIG. 1 is a diagram illustrating an example of the configuration of a communication system 1 according to the present exemplary embodiment. As illustrated in FIG. 1, the communication system 1 includes user equipment (UE) 2, communication equipment 3 of a carrier, and a virtual gateway (GW) 5.

The UE 2 is terminals used by users and will be referred to as "terminals 2" hereinafter. The terminals 2 may be of any type insofar as the terminals 2 have a function of communicating data over a wireless network. Each of the terminals 2 may be, for example, a smartphone, a tablet, a wearable terminal, a router, or an automotive navigation system.

Terminal unique information for uniquely identifying a terminal is given to and stored in each of the terminals 2. The terminal unique information may be of any type insofar as a terminal can be uniquely identified. For example, the terminal unique information is a media access control (MAC) address or a serial number of each of the terminals 2.

The communication equipment 3 is managed by the carrier that provides a wireless communication service and includes a control system 3A and a mobile wireless communication network (mobile carrier network) 3B.

The control system 3A is also called a "core network (CN)". The control system 3A includes switches and a management apparatus that manages subscriber information in the wireless communication service and provides the wireless communication service for the users by performing network control and data communication processing.

The mobile carrier network 3B is also called a "radio access network (RAN)" and constructed by plural base stations. The mobile carrier network 3B is connected to not only the terminals 2 but also the Internet 4, which is an example of an external network.

The virtual GW 5 is a relay apparatus that relays the Internet 4 to a local network 6. The virtual GW 5 prevents leakage of information from network devices 7 connected to the local network 6 and alteration of data held in the network devices 7 due to unauthorized access from external devices (not illustrated) connected to the Internet 4.

The local network 6 is a closed network in a certain organization. The local network 6 may be, for example, an in-house LAN of a company, a home network for domestic use, or a network for a public facility such as a school, a hospital, or a local government.

That is, the network devices 7 connected to the local network 6 are connected to the terminals 2 via the mobile carrier network 3B and the Internet 4. In order to prevent unauthorized access, however, the virtual GW 5 permits only certain terminals 2 to connect to the local network 6. The virtual GW 5, therefore, authenticates terminals 2 connecting to the local network 6 for the first time and registers terminals 2 that have been successfully authenticated as terminals that may be connected to the local network 6. Each time a terminal 2 makes a request to connect to the local network 6, the virtual GW 5 checks whether the terminal 2 is one that has been successfully authenticated to determine whether to connect the terminal 2 to the local network 6. A process relating to the terminal authentication will be described in detail later.

There are two types of terminals 2, namely a terminal 2A, which has a communication protocol according to the wireless communication service provided by the carrier and can be connected to the mobile carrier network 3B, and a terminal 2B, which does not have the communication protocol. In order to connect the terminal 2B to one of the network devices 7 on the local network 6, therefore, the terminal 2B connects to the terminal 2A using a communication method such as Wi-Fi (registered trademark) or Bluetooth (registered trademark) and then connects to the network devices 7 via the terminal 2A. When the terminals 2A and 2B need not be distinguished from each other in the following description, the terminal 2A or 2B will be referred to as a "terminal 2". A communication method used by the terminal 2B to connect to the terminal 2A will be referred to as "local communication".

Figure 2:
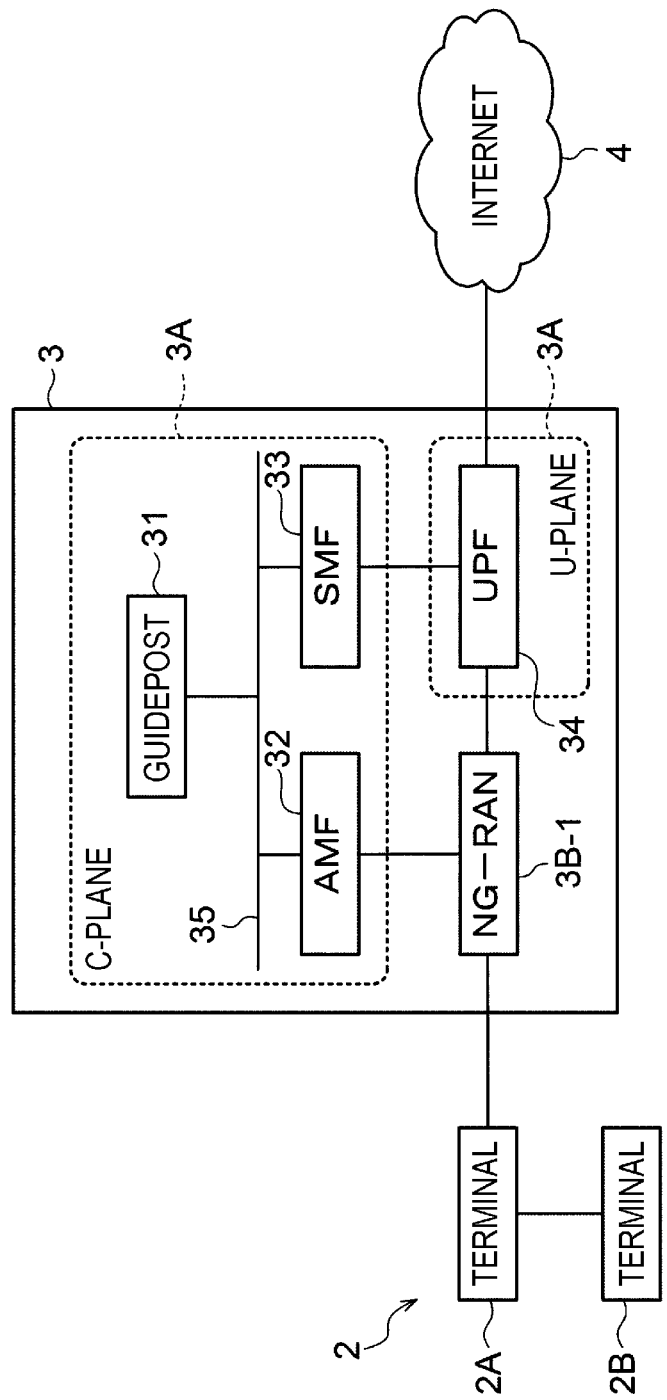
FIG. 2 is a diagram illustrating an example of the functional configuration of communication equipment.

FIG. 2 is a diagram illustrating an example of the functional configuration of the communication equipment 3. Although the communication equipment 3 will be described on the basis of an example of the functional configuration of a fifth-generation mobile communications system (5G) in the present exemplary embodiment, the communication equipment 3 is not limited to 5G. The communication equipment 3 may have a functional configuration for achieving a mobile communications system in a generation other than 5G, instead.

In the case of 5G, the mobile carrier network 3B is implemented as a next-generation RAN (NG-RAN) 3B-1. The control system 3A is achieved by a control plane (C-plane) and a user plane (U-plane).

The C-plane is a functional unit that performs communication control such as establishment and disconnection of communication. The U-plane is a functional unit that transfers user data communicated by the terminals 2 and the virtual GW 5 in accordance with the control performed by the C-plane. The user data refers to data communicated between the terminals 2 and the virtual GW 5.

The C-plane includes, for example, a guidepost 31, an access and mobility management function (AMF) 32, and a session management function (SMF) 33. The guidepost 31, the AMF 32, and the SMF 33 are connected to one another through an internal bus 35 of the C-plane.

The guidepost 31 is an example of an information processing apparatus and holds a connection information table on which terminal unique information regarding terminals 2 that have been successfully authenticated by the virtual GW 5 and connection information regarding the virtual GW 5 that has authenticated the terminals 2 are associated with each other.

When viewed from a terminal 2, the local network 6 is connected to a terminal 2 over the mobile carrier network 3B and the Internet 4. In order to connect to the local network 6, therefore, the terminal 2 needs to cause the communication equipment 3 to establish a session for transferring data between the mobile carrier network 3B and the Internet 4. That is, only terminals 2 that have successfully completed network authentication performed by the communication equipment 3 can connect to the local network 6 over the mobile carrier network 3B. Before connecting to the local network 6, therefore, the terminal 2 transmits a request to establish a session to the control system 3A.

If there is connection information regarding a virtual GW 5 on the connection information table associated with terminal unique information attached to the request to establish a session, the guidepost 31 obtains the connection information from the connection information table. The guidepost 31 then transmits the obtained connection information to the AMF 32 through the internal bus 35 of the C-plane to guide the terminal 2 that has transmitted the request to establish a session to connect to the virtual GW 5 indicated by the connection information.

The AMF 32 is connected to the NG-RAN 3B-1 and provides functions of authenticating a network and managing mobility using an international mobile subscriber identity (IMSI) of a terminal 2. When the AMF 32 receives a request to establish a session from a terminal 2, the AMF 32 transmits terminal unique information attached to the request to establish a session and an IMSI to the guidepost 31 through the internal bus 35 of the C-plane.

The SMF 33 is connected to a user plane function (UPF) 34 of the U-plane. The SMF 33 manages sessions of the terminals 2 and selects and controls the UPF 34 in order to transfer data between the terminals 2 and the virtual GW 5.

Although it is assumed in the following description that the guidepost 31, the AMF 32, and the SMF 33 are each achieved by an independent computer, the functional units included in the C-plane may be achieved by any configuration of computers.

The U-plane, on the other hand, includes the UPF 34.

The UPF 34 transfers user data between the NG-RAN 3B-1 and the Internet 4.

Next, a sequence of a process for registering a terminal 2 to the virtual GW 5 as a terminal that may be connected to the local network 6 will be described.

Figure 3:
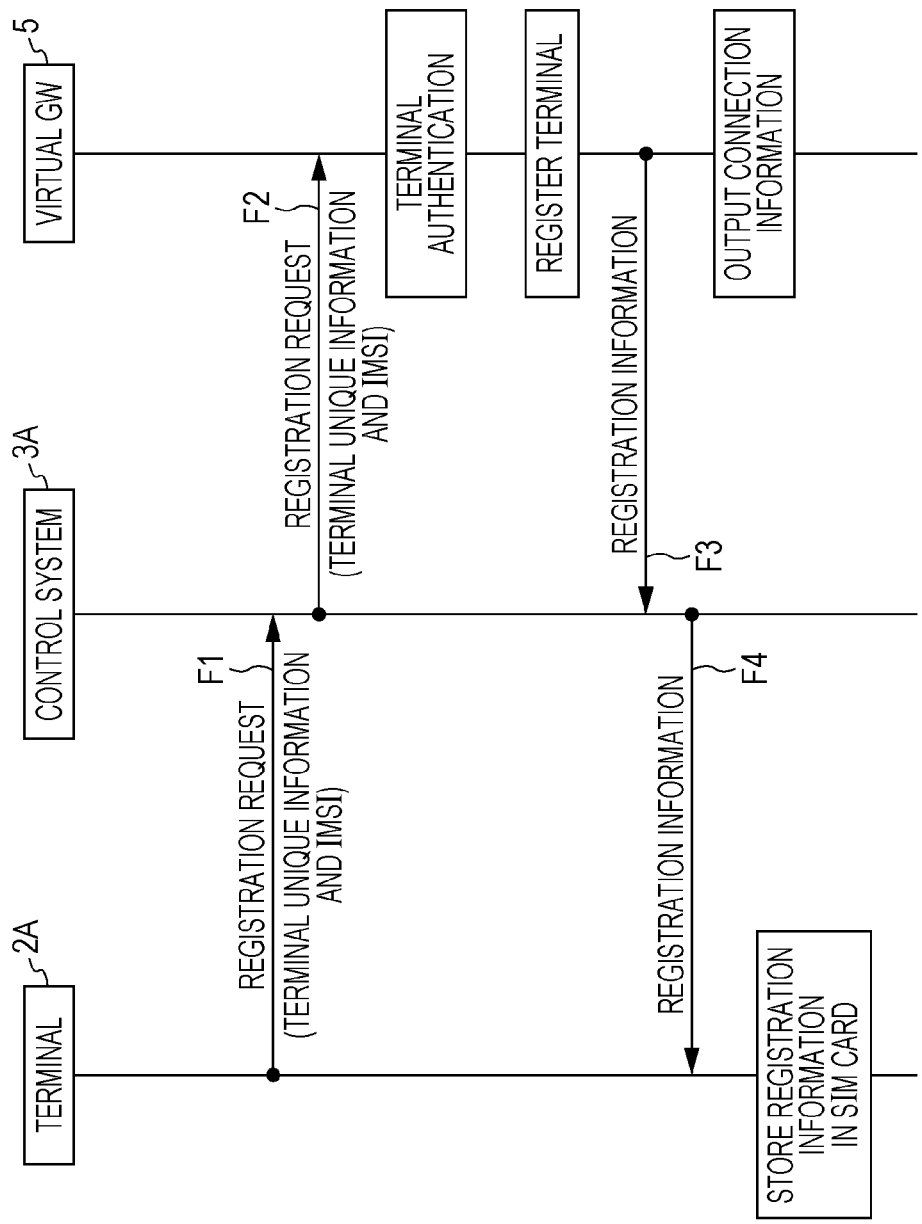
FIG. 3 is a sequence diagram illustrating an example of a process for registering a terminal having a function of directly connecting to a mobile carrier network at a time when authentication of the terminal succeeds.

FIG. 3 is a sequence diagram illustrating an example of a process for registering the terminal 2A having a function of directly connecting to the mobile carrier network 3B.

It is assumed that, only for a first time, a user of the terminal 2A has input, to the terminal 2A, connection information regarding a virtual GW 5 to which the terminal 2A is to be registered and the control system 3A has completed network authentication for the terminal 2A. It is also assumed that the terminal 2A and the virtual GW 5 have each generated a combination of a public key and a private key. The terminal 2A holds the public key of the virtual GW 5, and the virtual GW 5 holds the public key of the terminal 2A.

The terminal 2A puts an electronic signature to a registration request including terminal unique information regarding the terminal 2A and an IMSI using the private key thereof and transmits the registration request to the virtual GW 5 through the communication equipment 3 (refer to F1 and F2 in FIG. 3).

Upon receiving the registration request, the virtual GW 5 verifies the electronic signature using the public key of the terminal 2A and confirms that the registration request has been transmitted from the terminal 2A corresponding to the public key. Furthermore, the virtual GW 5 performs, using the terminal unique information included in the registration request, terminal authentication for determining whether the registration request has been transmitted from a terminal 2A permitted to connect to the local network 6.

More specifically, the virtual GW 5 performs the terminal authentication by referring to a connection permission table, where terminal unique information regarding terminals 2 permitted to connect to the local network 6 is described, and determining whether the connection permission table includes the terminal unique information regarding the terminal 2A that has transmitted the registration request.

If determining as a result of the terminal authentication that the connection permission table includes terminal unique information regarding the terminal 2A that has transmitted the registration request, the virtual GW 5 determines that the terminal authentication has been successfully completed, and registers the terminal 2A as an authorized terminal permitted to connect to the local network 6.

The virtual GW 5 then generates registration information for notifying the terminal 2A that the terminal 2A has been registered as an authorized terminal. The registration information in this case is information in which the connection information regarding the virtual GW 5, such as a name, an Internet protocol (IP) address, and a port number of the virtual GW 5, and the terminal unique information and the IMSI of the terminal 2A registered as an authorized terminal are associated with each other.

The virtual GW 5 puts an electronic signature to the generated registration using the private key thereof and transmits, through the communication equipment 3, the registration information to the terminal 2A that has transmitted the registration request (refer to F3 and F4 in FIG. 3). In this case, the virtual GW 5 may encrypt the registration information using a known encryption method.

Upon receiving the registration information, the terminal 2A confirms, using the electronic signature of the registration information, that the registration information has been transmitted from the virtual GW 5 to which the registration request has been transmitted, and stores the registration information in a subscriber identity module (SIM) card thereof, which is an example of a storage device.

The virtual GW 5 that has registered the terminal 2A as an authorized terminal, on the other hand, outputs the generated registration information to a manager thereof. The outputting of the registration information refers to making it possible for the manager of the virtual GW 5 to recognize the registration information. More specifically, the virtual GW 5 displays the registration information on a display apparatus connected thereto as text, prints the registration information on sheets of paper using an image forming apparatus connected thereto, or stores the registration information in a storage device that the manager of the virtual GW 5 is authorized to read.

The manager of the virtual GW 5 manually inputs the registration information output from the virtual GW 5 to the guidepost 31 of the control system 3A. The connection information table reflects the registration information input to the guidepost 31.

By manually inputting registration information to the guidepost 31 as described above, the number of times that the registration information is communicated on the Internet 4 decreases, and a probability of leakage of connection information regarding the virtual GW 5 decreases compared to when the virtual GW 5 transmits registration information to the guidepost 31 over the Internet 4.

The manager of the virtual GW 5 need not necessarily manually input registration information to the guidepost 31. The terminal 2A may transmit registration information received from the virtual GW 5 to the guidepost 31 over the mobile carrier network 3B, instead. Because the carrier ensures higher communication safety in the mobile carrier network 3B than on the Internet 4, the probability of leakage of connection information regarding the virtual GW 5 decreases compared to when the virtual GW 5 transmits registration information to the guidepost 31 over the Internet 4.

The process for registering the terminal 2A to the virtual GW 5 thus ends.

Figure 4:
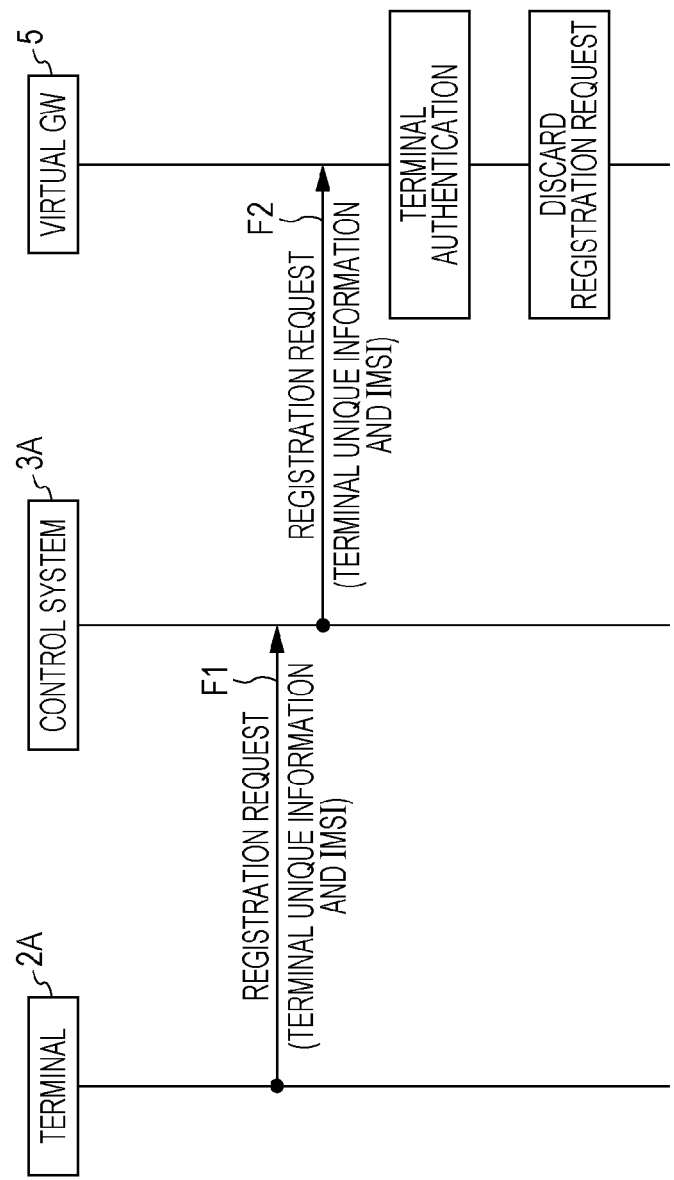
FIG. 4 is a sequence diagram illustrating an example of a process for registering the terminal having the function of directly connecting to the mobile carrier network at a time when the authentication of the terminal fails.

FIG. 4 is a sequence diagram illustrating an example of a process for registering the terminal 2A at a time when the authentication performed by the virtual GW 5 on the terminal 2A fails.

As illustrated in FIG. 4, if the terminal authentication performed on the terminal 2A fails, the virtual GW 5 discards the registration request received from the terminal 2A and ends the registration process. Registration information, therefore, is not generated for the terminal 2A that has not been successfully authenticated, and the connection information table managed by the guidepost 31 does not reflect an association between the terminal 2A that has not been successfully authenticated and connection information regarding the virtual GW 5 to which the terminal 2A has transmitted the registration request.

Figure 5:
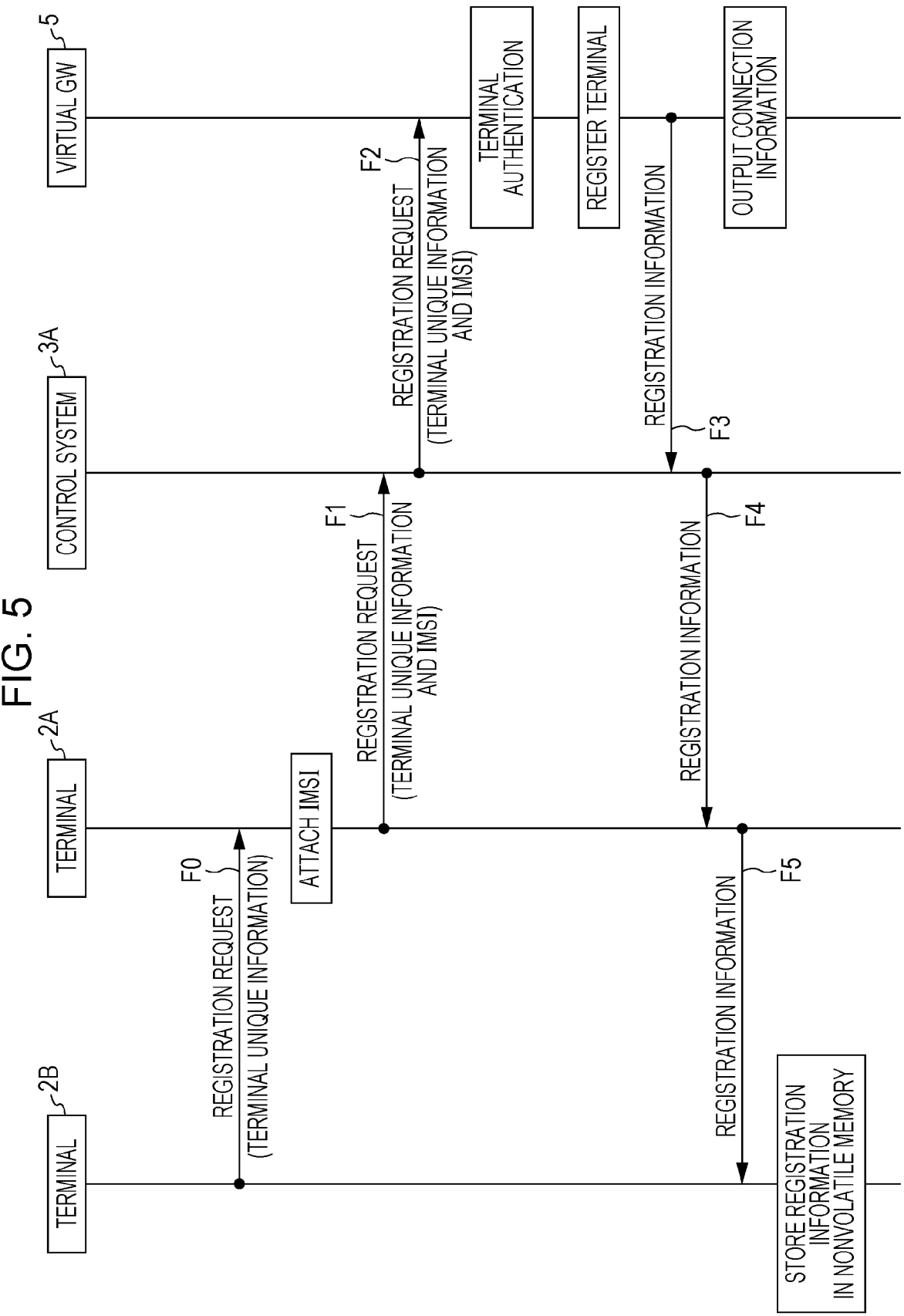
FIG. 5 is a sequence diagram illustrating an example of a process for registering the terminal that does not have the function of directly connecting to the mobile carrier network at a time when the authentication of the terminal succeeds.

FIG. 5 is a sequence diagram illustrating an example of a process for registering the terminal 2B, which does not have a function of directly connecting to the mobile carrier network 3B. As described above, the terminal 2B connects to the terminal 2A through local communication and then connects to the virtual GW 5 via the terminal 2A. In this case, the terminal 2A functions as a router.

It is assumed that, only for a first time, a user of the terminal 2B has input, to the terminal 2B, connection information regarding a virtual GW 5 to which the terminal 2B is to be registered and the control system 3A has completed network authentication for the terminal 2A. It is also assumed that the terminal 2A, the terminal 2B, and the virtual GW 5 have each generated a combination of a public key and a private key. The terminal 2B holds the public key of the virtual GW 5, and the virtual GW 5 holds the public keys of the terminals 2A and 2B.

The terminal 2B puts an electronic signature to a registration request including terminal unique information regarding the terminal 2B using the private key thereof and transmits the registration request to the terminal 2A through local communication (refer to F0 in FIG. 5).

Upon receiving the registration request from the terminal 2B, the terminal 2A attaches, to the registration request, an IMSI thereof to which an electronic signature has been put and transmits the registration request to the virtual GW 5 through the communication equipment 3 (refer to F1 and F2 in FIG. 5).

Upon receiving the registration request, the virtual GW 5 verifies the electronic signatures using the public keys of the terminals 2A and 2B and confirms that the registration request has been transmitted from the terminal 2B through the terminal 2A. Furthermore, the virtual GW 5 authenticates the terminal 2B by determining whether the connection permission table includes the terminal unique information regarding the terminal 2B included in the registration request.

If determining as a result of the terminal authentication that the connection permission table includes the terminal unique information regarding the terminal 2B that has transmitted the registration request, the virtual GW 5 determines that the terminal authentication has been successfully completed, and registers the terminal 2B as an authorized terminal permitted to connect to the local network 6. The virtual GW 5 then generates registration information for the terminal 2B.

The registration information in this case is information in which the connection information regarding the virtual GW 5, the terminal unique information regarding the terminal 2B registered as an authorized terminal, and the IMSI of the terminal 2A, which relays data from the terminal 2B, are associated with one another.

The virtual GW 5 puts an electronic signature to the generated registration using the private key thereof and transmits, through the communication equipment 3, the registration information to the terminal 2A that has transmitted the registration request (refer to F3 and F4 in FIG. 5). In this case, the virtual GW 5 may encrypt the registration information using a known encryption method.

Upon receiving the registration information, the terminal 2A transfers the registration information to the terminal 2B through local communication (refer to F5 in FIG. 5).

Upon receiving the registration information, the terminal 2B confirms, using the electronic signature of the registration information, that the registration information has been transmitted from the virtual GW 5 to which the registration request has been transmitted, and stores the registration information in a nonvolatile memory thereof, which is an example of a storage device.

After registering the terminal 2B as an authorized terminal, the virtual GW 5 outputs the generated registration information to the manager thereof.

The manager of the virtual GW 5 manually inputs the registration information output from the virtual GW 5 to the guidepost 31 of the control system 3A. Alternatively, the manager of the virtual GW 5 may transmit the registration information received by the terminal 2B from the virtual GW 5 to the guidepost 31 through the terminal 2A over the mobile carrier network 3B.

The virtual GW 5 need not necessarily include the connection information regarding the virtual GW 5 in the registration information. In this case, the manager of the virtual GW 5 manually inputs information in which the registration information and the connection information regarding the virtual GW 5 are associated with each other to the guidepost 31 of the control system 3A.

The process for registering the terminal 2B to the virtual GW 5 thus ends.

Figure 6:
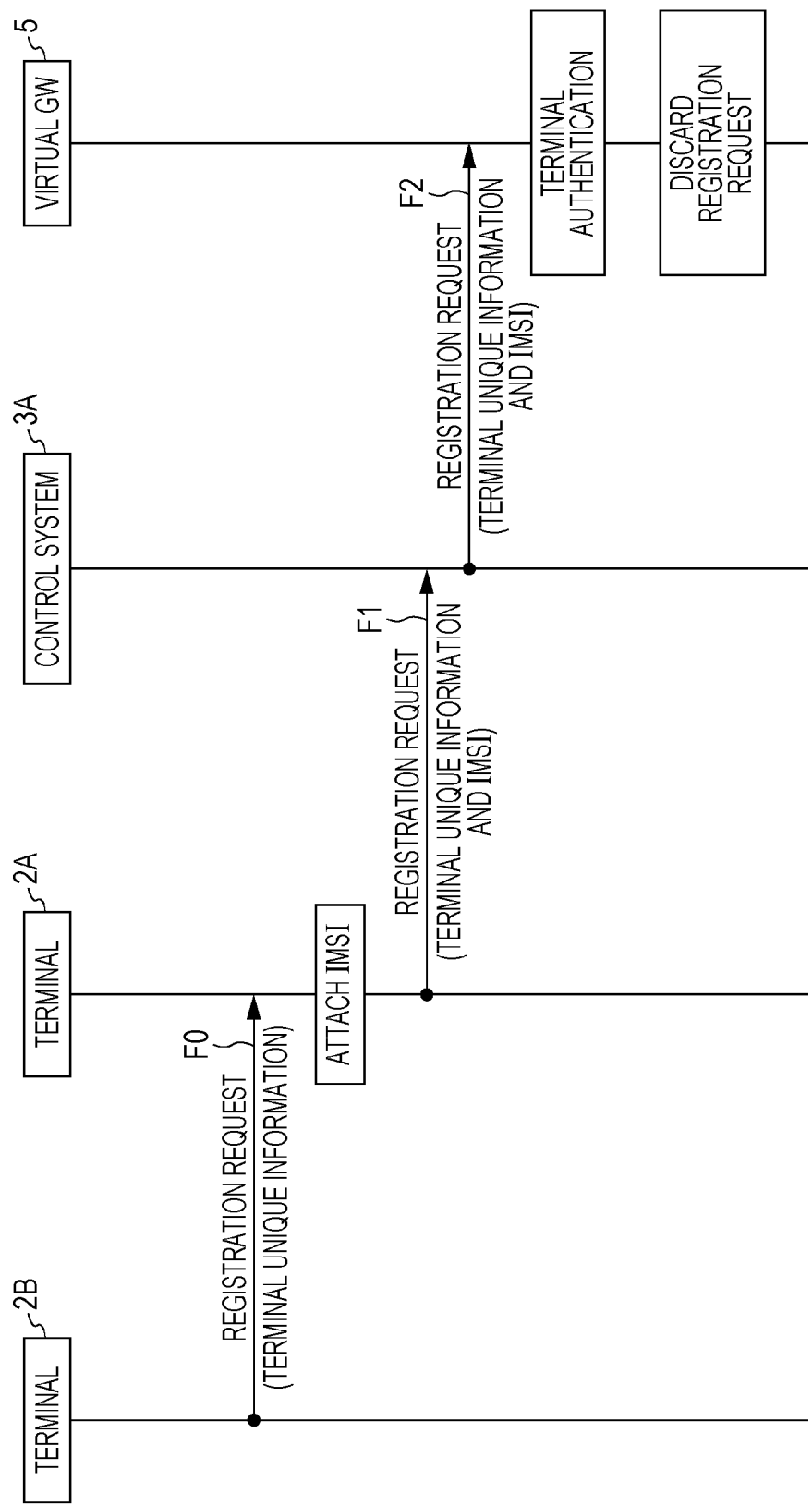
FIG. 6 is a sequence diagram illustrating an example of a process for registering the terminal that does not have the function of directly connecting to the mobile carrier network at a time when the authentication of the terminal fails.

FIG. 6 is a sequence diagram illustrating an example of a process for registering the terminal 2B at a time when the authentication performed by the virtual GW 5 on the terminal 2B fails.

As illustrated in FIG. 6, if the terminal authentication performed on the terminal 2B fails, the virtual GW 5 discards the registration request received from the terminal 2B and ends the registration process. Registration information, therefore, is not generated for the terminal 2B that has not been successfully authenticated, and the connection information table managed by the guidepost 31 does not reflect an association between the terminal 2B that has not been successfully authenticated and connection information regarding the virtual GW 5 to which the terminal 2B has transmitted the registration request.

Next, an example of the configuration of electrical systems of computers 10 and 20, which achieve the guidepost 31 and the AMF 32, respectively, will be described.

Figure 7:
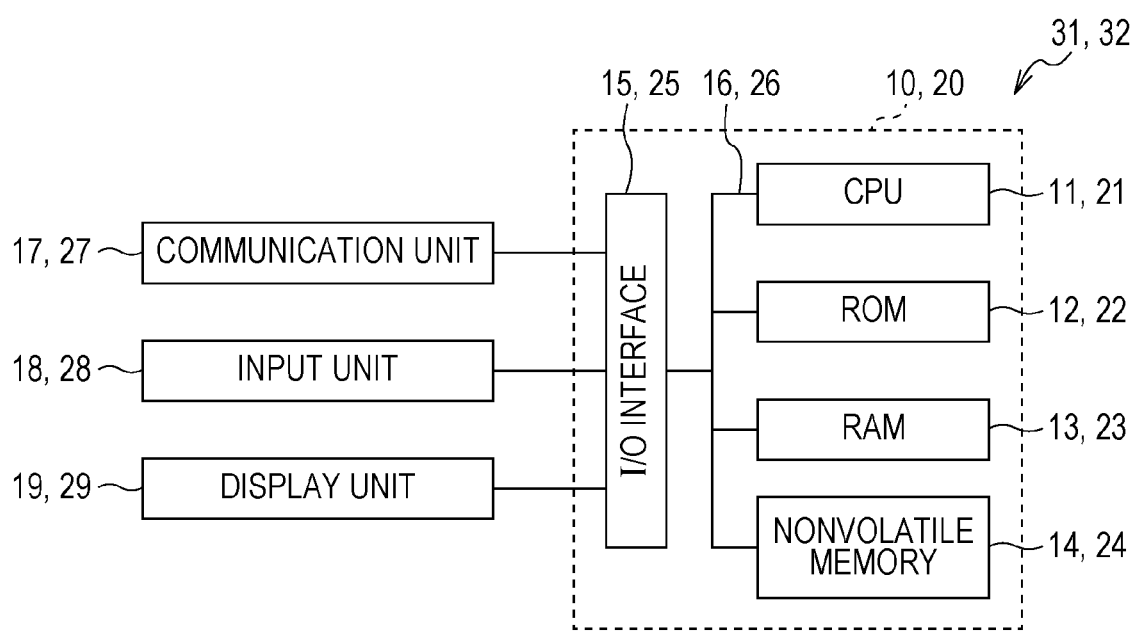
FIG. 7 is a diagram illustrating an example of the configuration of electrical systems of a guidepost and an access and mobility management function (AMF)

FIG. 7 is a diagram illustrating the example of the configuration of the electrical systems of the computers 10 and 20.

The computer 10 includes a central processing unit (CPU) 11, which is an example of a processor that achieves processing performed by the guidepost 31 illustrated in FIG. 2, a read-only memory (ROM) storing a program for processing information, which causes the computer 10 to function as the guidepost 31, a random-access memory (RAM) used by the CPU 11 as a temporary working area, a nonvolatile memory 14, and an input/output (I/O) interface 15. The CPU 11, the ROM 12, the RAM 13, the nonvolatile memory 14, and the I/O interface 15 are connected to one another by a bus 16.

The nonvolatile memory 14 is an example of a storage device that maintains stored information even when power is no longer supplied thereto. A semiconductor memory, for example, is used as the nonvolatile memory 14, but a hard disk may be used, instead. Information that needs to be maintained even when power is no longer supplied to the guidepost 31, such as the connection information table, is stored in the nonvolatile memory 14.

The nonvolatile memory 14 need not be incorporated into the computer 10 and may be, for example, a portable storage device removably attached to the computer 10, instead.

A communication unit 17, an input unit 18, and a display unit 19, for example, are connected to the I/O interface 15.

The communication unit 17 is connected to the internal bus 35 of the C-plane and has a communication protocol for communicating data with the functional units in the C-plane, such as the AMF 32 and the SMF 33.

The input unit 18 receives instructions from an operator of the guidepost 31 and notifies the CPU 11 of the instructions. Buttons, a touch panel, a keyboard, or a mouse, for example, is used as the input unit 18.

The display unit 19 is an example of a device that visually indicates information processed by the CPU 11. A liquid crystal display or an organic electroluminescent (EL) display, for example, is used as the display unit 19.

The computer 20 that achieves the AMF 32 has the same configuration, for example, as the computer 10 that achieves the guidepost 31. A CPU 21, a ROM 22, a RAM 23, a nonvolatile memory 24, an I/O interface 25, and a bus 26 of the computer 20 have the same functions as the CPU 11, the ROM 12, the RAM 13, the nonvolatile memory 14, the I/O interface 15, and the bus 16, respectively, of the computer 10 that achieves the guidepost 31. That is, the CPU 21 achieves processing performed by the AMF 32 illustrated in FIG. 2, and the ROM 22 stores a program for processing information, which causes the computer 20 to function as the AMF 32.

A communication unit 27, an input unit 28, and a display unit 29, for example, are connected to the I/O interface 25.

The communication unit 27 is connected to the internal bus 35 of the C-plane and the NG-RAN 3B-1 and has a communication protocol for communicating data with the functional units in the C-plane, the terminals 2, and the virtual GW 5.

The input unit 28 receives instructions from an operator of the AMF 32 and notifies the CPU 21 of the instructions. The display unit 29 is an example of a device that visually indicates information processed by the CPU 21.

Next, a process for connecting a terminal 2 to the local network 6 in the communication system 1 will be described.

Figure 8:
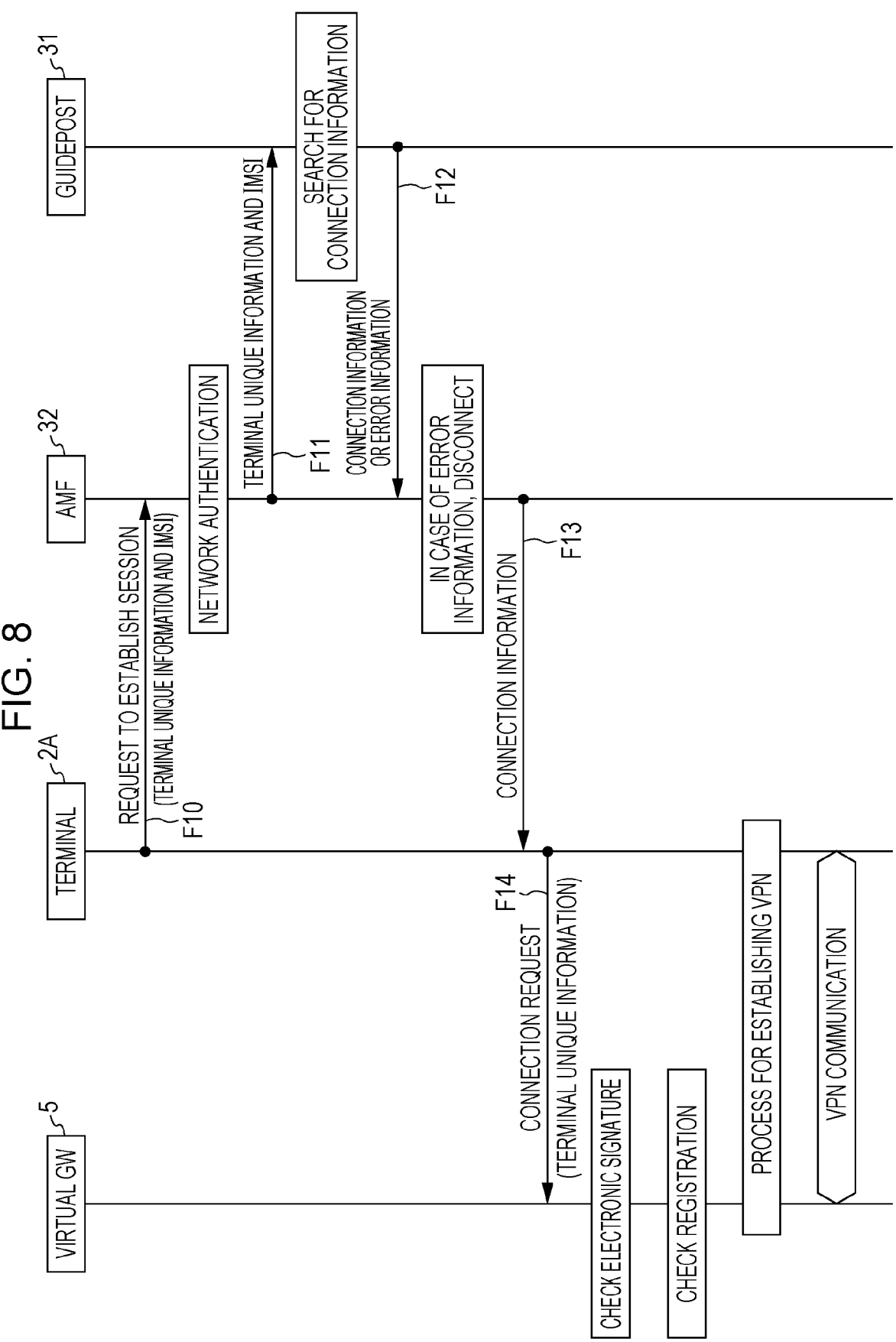
FIG. 8 is a sequence diagram illustrating an example of a process for connecting, to a local network, the terminal having the function of directly connecting to the mobile carrier network.
Figure 9:
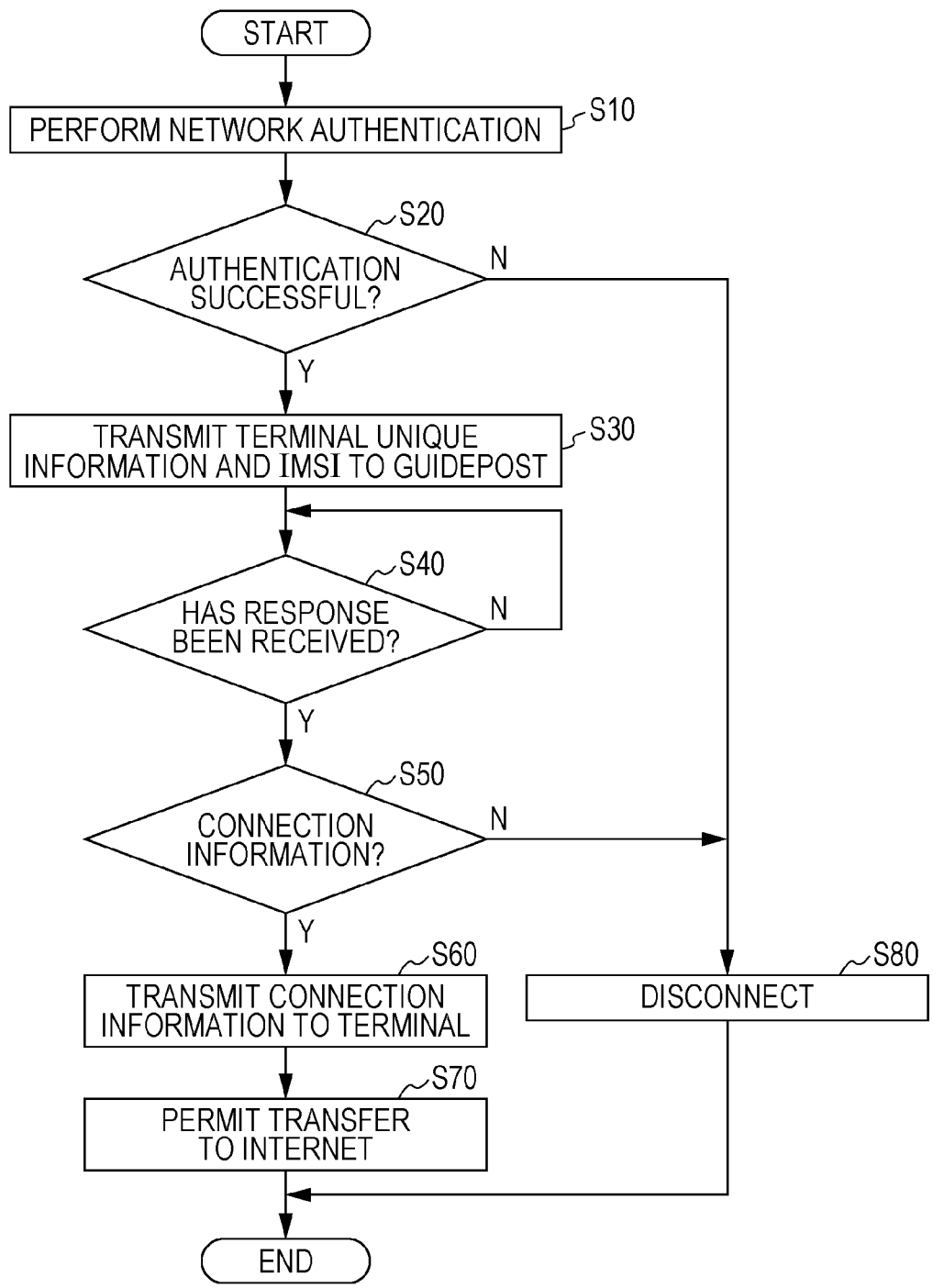
FIG. 9 is a flowchart illustrating an example of a process for establishing a session performed by the AMF.
Figure 10:
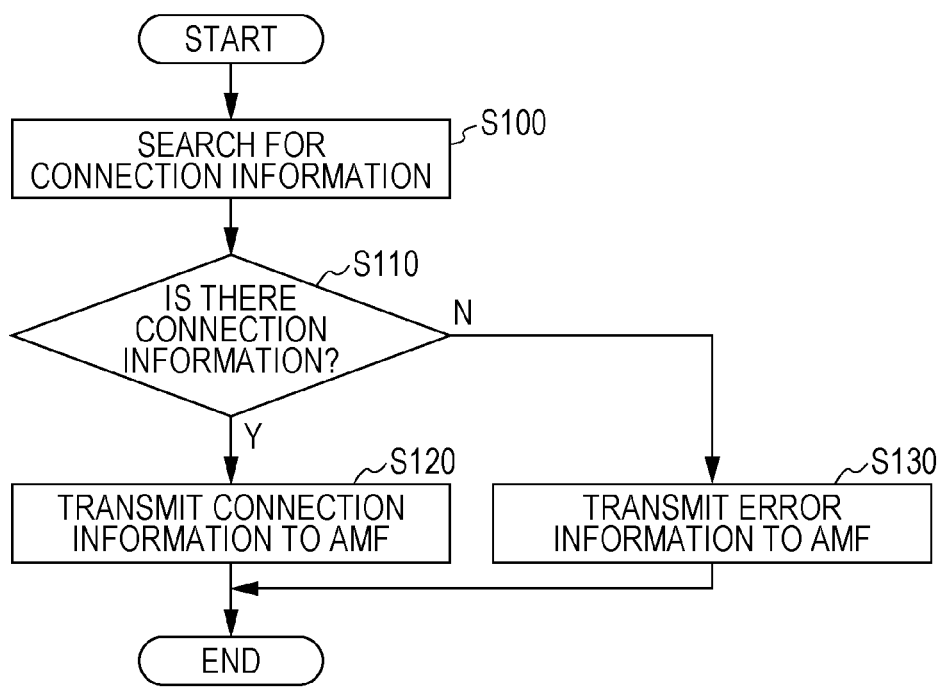
FIG. 10 is a flowchart illustrating an example of a process for establishing a session performed by a guidepost.

FIG. 8 is a sequence diagram illustrating an example of the process for connecting the terminal 2A, which is one of the terminals 2, to the local network 6. FIGS. 9 and 10 are flowcharts illustrating an example of processes for establishing a session performed by the CPU 21 of the AMF 32 and the CPU 11 of the guidepost 31, respectively.

It is assumed that the guidepost 31 has generated a combination of a public key and a private key and the virtual GW 5 holds the public key of the guidepost 31 as well as the public key of the terminal 2A used in the registration process.

First, the terminal 2A obtains the terminal unique information and the IMSI from the SIM card thereof and transmits a request to establish a session including the terminal unique information and the IMSI to the mobile carrier network 3B in order to establish a session from the terminal 2A to the local network 6 (F10 in FIG. 8).

When the AMF 32 of the control system 3A receives the request to establish a session over the mobile carrier network 3B, the CPU 21 of the computer 20 performs the process for establishing a session illustrated in FIG. 9.

In step S10 illustrated in FIG. 9, the CPU 21 refers to the IMSI included in the request to establish a session and performs network authentication for determining whether the request has been transmitted from the terminal 2A that has a valid network contract.

More specifically, the CPU 21 refers to a customer table storing contract network information regarding the wireless communication service provided by the carrier and performs network authentication by determining whether the customer table includes the IMSI of the terminal 2A that has transmitted the request to establish a session.

If the CPU 21 determines in step S20 that the request to establish a session has been transmitted from the terminal 2A that has a valid network contract, that is, if the CPU 21 determines in step S20 that the network authentication has been successfully completed, the process proceeds to step S30.

In step S30, the CPU 21 transmits the terminal unique information and the IMSI included in the request to establish a session to the guidepost 31 through the internal bus 35 of the C-plane (F11 in FIG. 8).

In step S40, the CPU 21 determines whether the CPU 21 has received, from the guidepost 31, a response to the transmission of the terminal unique information and the IMSI. If not, the CPU 21 repeatedly makes the determination in step S40 to monitor a response from the guidepost 31.

When the guidepost 31 receives the terminal unique information and the IMSI from the AMF 32, the CPU 11 of the computer 10 performs the process for establishing a session illustrated in FIG. 10.

In step S100 illustrated in FIG. 10, the CPU 11 searches the connection information table for connection information regarding a virtual GW 5 associated with a combination of the terminal unique information and the IMSI received from the AMF 32.

In step S110, the CPU 11 determines, on the basis of a result of the search for the connection information in step S100, whether the connection information table includes the connection information regarding the virtual GW 5 associated with the combination of the terminal unique information and the IMSI received from the AMF 32. If so, the process proceeds to step S120.

In step S120, the CPU 11 obtains, from the connection information table, the connection information regarding the virtual GW 5 associated with the combination of the terminal unique information and the IMSI received from the AMF 32. The CPU 11 attaches the terminal unique information received from the AMF 32 to the obtained connection information and transmits the connection information to the AMF 32 through the internal bus 35 (F12 in FIG. 8). In this case, the CPU 11 puts an electronic signature to the connection information to be transmitted.

If the CPU 11 determines in step S110 that the connection information table does not include the connection information regarding the virtual GW 5 associated with the combination of the terminal unique information and the IMSI received from the AMF 32, the process proceeds to step S130.

In step S130, the CPU 11 generates error information for notifying the AMF 32 that the connection information table does not include the connection information regarding the virtual GW 5 associated with the combination of the terminal unique information and the IMSI received from the AMF 32 and transmits the error information to the AMF 32 through the internal bus 35 (F12 in FIG. 8).

The process for establishing a session performed by the guidepost 31 illustrated in FIG. 10 thus ends.

That is, as a result of the process for establishing a session performed by the guidepost 31, the guidepost 31 transmits connection information or error information to the AMF 32 as a response to the transmission of the terminal unique information and the IMSI from the AMF 32.

When the guidepost 31 transmits a response to the AMF 32, the CPU 21 of the AMF 32 determines in step S40 illustrated in FIG. 9 that a response has been received from the guidepost 31, and the process proceeds to step S50 illustrated in FIG. 9.

In step S50, the CPU 21 determines whether the response received from the guidepost 31 is connection information. If so, the process proceeds to step S60.

Transmission of connection information from the guidepost 31 means that the terminal 2A is an authorized terminal permitted to connect to the virtual GW 5. In step S60, therefore, the CPU 21 transmits the connection information received from the guidepost 31 to the terminal 2A, which has transmitted the request to establish a session (F13 in FIG. 8).

In step S70, the CPU 21 controls the UPF 34 through the SMF 33 such that the mobile carrier network 3B and the Internet 4 mutually transfer user data regarding the user of the terminal 2A, the user data being indicated by the IMSI included in the request to establish a session. As a result, a session is established between the terminal 2A, which has transmitted the request to establish a session, and the Internet 4. The terminal 2A, which has transmitted the request to establish a session, and the virtual GW 5 thus become able to communicate with each other.

If the CPU 21 determines in step S20 that the network authentication has failed, or if the CPU 21 determines in step S50 that the response received from the guidepost 31 is error information, on the other hand, the received request to establish a session has been transmitted from the terminal 2A that has failed in at least either the network authentication performed by the communication equipment 3 or the terminal authentication in the registration process performed by the virtual GW 5.

Because a request to establish a session from such a terminal 2A can lead to unauthorized access, the process proceeds to step S80.

In step S80, the CPU 21 discards the request to establish a session received from the terminal 2A and disconnects from the CPU 21. The process for establishing a session illustrated in FIG. 9 thus ends.

If receiving connection information from the guidepost 31, on the other hand, the terminal 2A checks terminal unique information attached to the connection information. If the terminal unique information attached to the connection information is terminal unique information regarding the terminal 2A, the terminal 2A transmits a connection request to the virtual GW 5 over a virtual private network (VPN) using the received connection information (F14 in FIG. 8). The connection request includes the electronic signature put by the guidepost 31 to the connection information and the terminal unique information and the IMSI of the terminal 2A.

Upon receiving the connection request, the virtual GW 5 checks the electronic signature of the connection information included in the connection request using the public key of the guidepost 31. If the electronic signature of the connection information is that of the guidepost 31, it is confirmed that the connection request has been transmitted from the authorized terminal 2A that has successfully completed the network authentication performed by the communication equipment 3.

Furthermore, the virtual GW 5 performs, using the terminal unique information included in the connection request, terminal authentication for checking whether the terminal 2A that has transmitted the connection request is the terminal 2A registered to the virtual GW 5 in advance as an authorized terminal as a result of the registration process illustrated in FIG. 3.

If a terminal 2 is lost or stolen, for example, the manager removes the terminal 2 as an authorized terminal registered in the virtual GW 5. In this case, the virtual GW 5 rejects connection from the terminal 2 to the local network 6.

If confirming that the electronic signature of the connection information is that of the guidepost 31 and successfully authenticates the terminal 2A, the virtual GW 5 performs a process for establishing a VPN to connect with the terminal 2A over the VPN. As a result, the terminal 2A and the local network 6 are connected to each other over the VPN.

By using a VPN, communication safety is ensured with techniques such as tunneling for connecting devices such as the terminal 2 and the virtual GW 5, capsuling of data, authentication for checking whether a communication destination is an authorized device, and encryption for increasing data safety and reducing a probability of data alteration. A maintenance cost of the VPN is also lower than that of a dedicated line.

If it is not confirmed that the electronic signature of the connection information is that of the guidepost 31 or if the terminal authentication of the terminal 2A fails, the virtual GW 5 discards the connection request from the terminal 2A without performing the process for establishing a VPN. That is, the virtual GW 5 rejects connection from the terminal 2A to the local network 6.

Although the process for connecting the terminal 2A, which can directly connect to the mobile carrier network 3B, to the local network 6 has been described above, the terminal 2B, which does not directly connect to the mobile carrier network 3B, too, can connect to the local network 6 by cooperating with the terminal 2A.

FIGS. 11 and 12 are sequence diagrams illustrating an example of a process for connecting the terminal 2B, which is another of the terminals 2, to the local network 6.

The terminal 2B connects to the terminal 2A through local communication and transmits a request to establish a session to the mobile carrier network 3B through the terminal 2A (F9 and F10 in FIG. 11). An IMSI, however, is not given to the terminal 2B since the terminal 2B does not directly connect to the mobile carrier network 3B. The terminal 2B, therefore, obtains only the terminal unique information from the nonvolatile memory thereof and transmits, to the terminal 2A, a request to establish a session including the terminal unique information (F9 in FIG. 11).

The terminal 2A attaches the IMSI stored in the SIM card thereof to the request to establish a session received from the terminal 2B and transfers the request to the mobile carrier network 3B (F10 in FIG. 11). As a result, the terminal 2A connects to the mobile carrier network 3B.

The CPU 21 of the AMF 32 and the CPU 11 of the guidepost 31 then perform the processes for establishing a session illustrated in FIGS. 9 and 10 for the terminal 2B.

As a result, if the network authentication succeeds and the connection information table managed by the guidepost 31 includes connection information regarding a virtual GW 5 associated with a combination of the terminal unique information and the IMSI included in the request to establish a session, the AMF 32 transmits the connection information regarding the virtual GW 5 to the terminal 2A (F13 in FIG. 11). If the network authentication fails, or if a response received from the guidepost 31 is error information, the AMF 32 discards the request to establish a session received from the terminal 2A and disconnects from the terminal 2A to end the process for establishing a session as in the case of the terminal 2A.

If receiving connection information including the terminal unique information regarding the terminal 2B from the mobile carrier network 3B, the terminal 2A transfers the connection information to the terminal 2B indicated by the terminal unique information through local communication (F15 in FIG. 11). As a result, even the terminal 2B, which does not directly connect to the mobile carrier network 3B, can obtain connection information regarding a virtual GW 5 from the guidepost 31.

As illustrated in FIG. 12, therefore, if the terminal unique information attached to the connection information is the terminal unique information regarding the terminal 2B, the terminal 2B transmits, to the terminal 2A, a request to connect to the virtual GW 5 indicated by the connection information, the request including an electronic signature put by the guidepost 31 to the connection information and the terminal unique information regarding the terminal 2B (F16 in FIG. 12).

Upon receiving the connection request from the terminal 2B, the terminal 2A attaches the IMSI stored in the SIM card thereof to the connection request received from the terminal 2B and transfers the connection request to the mobile carrier network 3B. As a result, the connection request is transmitted to the virtual GW 5 indicated by the connection information over the mobile carrier network 3B and the Internet 4 (F17 in FIG. 12).

Thereafter, as illustrated in FIG. 8, if confirming that the electronic signature of the connection information is that of the guidepost 31 and the terminal authentication performed on the terminal 2B succeeds, the virtual GW 5 performs the process for establishing a VPN to connect the terminal 2B thereto over a VPN. As a result, the terminal 2B and the local network 6 are connected to each other through the terminal 2A over the VPN.

If there are plural virtual GWs 5, a user of a terminal 2 may select a name of a virtual GW 5 to which the terminal 2 is to be connected. In this case, the name of the selected virtual GW 5 is also attached to a request to establish a session transmitted from the terminal 2. If a request to establish a session includes a name of a virtual GW 5, the AMF 32 transmits the name of the virtual GW 5 to the guidepost 31 as well as terminal unique information and an IMSI. Upon receiving the terminal unique information, the IMSI, and the name of the virtual GW 5, the guidepost 31 may obtain, from the connection information table, connection information regarding a virtual GW 5 associated with a combination of the terminal unique information, the IMSI, and the virtual GW 5 and transmit the connection information to the AMF 32.

Although an aspect of the communication system 1 has been described on the basis of an exemplary embodiment, the disclosed communication system 1 is an example, and a mode of the communication system 1 is not limited to that described in the above exemplary embodiment. The embodiment may be modified or improved in various ways without deviating from the scope of the present disclosure, and the technical scope of the present disclosure also includes modes obtained as a result of the modification or the improvement. For example, order of the steps illustrated in the sequence diagrams of FIGS. 3 to 6, 8, 11, and 12 and order of the steps in the processes for establishing a session illustrated in FIGS. 9 and 10 may be changed without deviating from the scope of the present disclosure.

In the above exemplary embodiment, the processes for establishing a session are achieved by software. Processes equivalent to those illustrated in the flowcharts of FIGS. 9 and 10, however, may be achieved by hardware, instead. In this case, processing speed increases compared to when the processes for establishing a session are achieved by software.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Although an example in which the ROM 12 of the guidepost 31 and the ROM 22 of the AMF 32 each store a program for processing information has been described in the above exemplary embodiment, the programs for processing information need not necessarily be stored in the ROMs 12 and 22. The programs for processing information in the present disclosure may be stored in a storage medium readable by the computers 10 and 20 and provided. For example, the programs for processing information may be stored in an optical disc such as a compact disc read-only memory (CD-ROM) or a digital versatile disc read-only memory (DVD-ROM) and provided. Alternatively, the programs for processing information may be stored in a portable semiconductor memory such as a universal serial bus (USB) memory or a memory card and provided. The ROMs 12 and 22, the nonvolatile memories 14 and 24, the CD-ROM, the DVD-ROM, the USB memory, and the memory card are examples of a non-transitory storage medium.

Furthermore, the guidepost 31 and the AMF 32 may download the programs for processing information from an external apparatus through the communication units 17 and 27, respectively, and store the downloaded programs in storage devices. In this case, the CPU 11 of the guidepost 31 and the CPU 21 of the AMF 32 perform the processes for establishing a session by reading the programs downloaded from the external apparatus.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a memory configured to store data; and
a hardware processor configured to:
transmit, in a case where terminal unique information is received from a terminal subjected to network authentication through an internal bus of a control plane of communication equipment of a carrier, connection information regarding a relay apparatus to the terminal through the internal bus, the relay apparatus being associated with the terminal unique information as an apparatus to be connected to a local network; and cause the terminal to connect to the relay apparatus, which is on a public network connected to a mobile carrier network provided by the carrier, using the connection information regarding the relay apparatus and, if the relay apparatus successfully authenticates the terminal, the terminal and the relay apparatus to be connected to each other over a virtual private network.

2. The information processing apparatus according to claim 1,
wherein the hardware processor is configured to:
refer to an association between the terminal unique information regarding the terminal that has been successfully authenticated by the relay apparatus in advance and the relay apparatus that has authenticated the terminal; and
transmit, to the terminal, the connection information regarding the relay apparatus associated with the terminal unique information.

3. The information processing apparatus according to claim 2,
wherein the hardware processor is configured to receive the association between the terminal unique information and the relay apparatus from the successfully authenticated terminal or a manager of the relay apparatus.

4. The information processing apparatus according to claim 1,
wherein the hardware processor is configured to receive the terminal unique information stored in a storage device of the terminal in advance.

5. The information processing apparatus according to claim 2,
wherein the hardware processor is configured to receive the terminal unique information stored in a storage device of the terminal in advance.

6. The information processing apparatus according to claim 3,
wherein the hardware processor is configured to receive the terminal unique information stored in a storage device of the terminal in advance.

7. A non-transitory computer readable medium storing a program causing a computer to execute a process for processing information, the process comprising:
transmitting, in a case where terminal unique information is received from a terminal subjected to network authentication through an internal bus of a control plane of communication equipment of a carrier, connection information regarding a relay apparatus to the terminal through the internal bus, the relay apparatus being associated with the terminal unique information as an apparatus to be connected to a local network; and
causing the terminal to connect to the relay apparatus, which is on a public network connected to a mobile carrier network provided by the carrier, using the connection information regarding the relay apparatus and, if the relay apparatus successfully authenticates the terminal, the terminal and the relay apparatus to be connected to each other over a virtual private network.

8. A communication system comprising:
a terminal having terminal unique information;
a relay apparatus that relays, to a local network, a public network connected to communication equipment of a carrier; and
an information processing apparatus that comprises a memory and a hardware processor, wherein the memory is configured to store data, and wherein the hardware processor is configured to:
in a case where the terminal unique information is received from the terminal subjected to network authentication through an internal bus of a control plane of the communication equipment of the carrier, transmit, to the terminal through the internal bus, the connection information regarding the relay apparatus associated with the terminal unique information,
wherein, in a case where the relay apparatus receives, through the public network, the terminal unique information from the terminal that has received the connection information, the relay apparatus authenticates the terminal using the received terminal unique information and, if successfully authenticating the terminal, connects the terminal and the local network to each other by connecting to the terminal over a virtual private network.

9. The communication system according to claim 8,
wherein the hardware processor of the information processing apparatus refers to an association between the terminal unique information regarding the terminal that has been successfully authenticated by the relay apparatus in advance and the relay apparatus that has authenticated the terminal and transmits, to the terminal, the connection information regarding the relay apparatus associated with the terminal unique information.

10. The communication system according to claim 9,
wherein the hardware processor of the information processing apparatus receives the association between the terminal unique information and the relay apparatus from the successfully authenticated terminal or a manager of the relay apparatus.

11. The communication system according to claim 8,
wherein the terminal stores, in a storage device, the terminal unique information with which the relay apparatus has successfully authenticated the terminal and, in a case where the terminal transmits the terminal unique information to the information processing apparatus, transmits the terminal unique information stored in the storage device in advance.

12. The communication system according to claim 11,
wherein, if the terminal has a function of connecting to the communication equipment of the carrier, the terminal stores the terminal unique information in a subscriber identity module card of the terminal.

13. The communication system according to claim 11,
wherein, if the terminal does not have a function of connecting to the communication equipment of the carrier, the terminal stores the terminal unique information in a nonvolatile memory of the terminal.

14. The communication system according to claim 13,
wherein the terminal transmits the terminal unique information to the information processing apparatus and the relay apparatus through a router having a function of connecting to the communication equipment of the carrier.

\* \* \* \* \*